Figure 1:
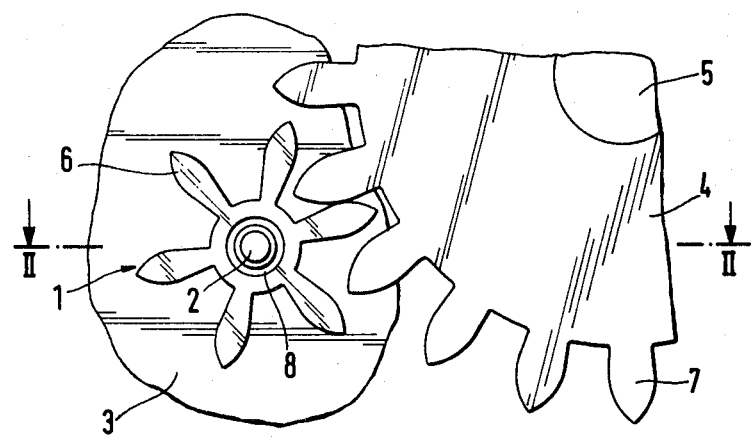

United States Patent [19]
Sudler et al.

[11] 4,250,576
[45] Feb. 10, 1981

[54] ELECTRIC CLOCK

[75] Inventors: Roland Sudler, Frankfurt am Main; Norbert Reiferscheid, Camberg-Würges, both of Fed. Rep. of Germany

[73] Assignee: Quarz-Zeit AG, Frankfurt am Main, Fed. Rep. of Germany

[21] Appl. No.: 921,963

[22] Filed: Jul. 5, 1978

[30] Foreign Application Priority Data
Jul. 15, 1977 [DE] Fed. Rep. of Germany ....... 2732047

[51] Int. Cl.³ .............................................. G04B 29/00
[52] U.S. Cl. .................................... 368/323; 368/324; 29/178
[58] Field of Search ................. 58/136, 137, 138, 139; 29/178; 74/DIG. 10; 403/273, 345; 368/323, 324, 318

[56] References Cited

U.S. PATENT DOCUMENTS

| | | | |
|---|---|---|---|
| 3,888,077 | 6/1975 | Bachmann | 58/139 |
| 3,930,361 | 1/1976 | Saito et al. | 58/139 |
| 4,127,984 | 12/1978 | Ogihara et al. | 58/139 |

OTHER PUBLICATIONS

"Adiprene L", Dupont de Nemours publication, Aug. 19, 1960, see paragraph-bottom, inside left page hard range chart.

*Primary Examiner*—Ulysses Weldon
*Attorney, Agent, or Firm*—Martin A. Farber

[57] ABSTRACT

An electric clock, particularly a quartz-crystal clock, having a motion work which is driven by an electric motor, and a pinion of an elastic material which meshes with an input gear of the motion work is seated on the shaft of the electric motor. The pinion is made of a soft-elastic material and is provided with a concentric recess for the free passage of the shaft and with an axial shoulder having a concentric hole to receive the shaft, and the input gear is made of an elastic material.

9 Claims, 2 Drawing Figures

ELECTRIC CLOCK

This invention relates to an electric clock, particularly a quartz-crystal clock, having a motion work which is driven by an electric motor, and a pinion of an elastic material which meshes with an input gear of the motion work is seated on the shaft of the electric motor.

In electric clocks, and particularly quartz-crystal timepieces, one essential requirement is that the clock operate as noiselessly as possible.

Various measures have already been taken in order to satisfy this requirement. Thus, for instance, it is known to provide the input gear of the motion work or dial train with slots between its teeth. Although it is true that a considerable dampening or silencing of the noise can be obtained in this manner, such an embodiment, however can be produced only with a considerable manufacturing expense. Another known measure is to produce the pinion which is seated on the motor shaft from an elastic material. In this connection it has been found that a reliable transmission of the torque, which gives rise to little frictional loss, from the pinion to the input gear of the motion work is only assured if the material used for the pinion is of a hard-elastic nature; the damping of the noise obtainable in this manner however leaves something to be desired. In other cases, namely when using a soft-elastic material for the pinion, the outer contour of the pinion is deformed when the pinion is placed on the motor shaft, with the result that the pinion and the input gear jam in each other. In itself, this could be counteracted by providing the pinion with a non-elastic bushing. However, in view of the small size of the pinion—the diameter of the pinion is only about 2 mm—, this results in considerable problems in manufacture, which problems heretofore have not been suitably solved. One has therefore gone over to lubricating the pinion, which pinion is made of a hard-elastic material. While a high muffling or dampening of the noise indeed can be obtained thereby, this dampening is not permanent since, with the passage of time, the lubricant present between the teeth is removed by the gear which meshes with the pinion and by the following gears which mesh with the first-mentioned gear. Therefore after only a short period of operation, the noise production is as great as with a non-lubricated pinion. All of this applies in an analogous manner also to the input gear, but with the difference that the manufacture of an input gear of soft-elastic material is substantially more difficult than the manufacture of a pinion made from a corresponding soft-elastic material. For this reason, there have been used up to now in practice only pinion/input-gear combinations made of hard-elastic material, the silencing or damping of the noise of which leaves a lot to be desired.

It is consequently an object of the present invention to create an electric clock having a minimal operational noise level. In addition, the technical expenditure necessary for this is to be as small as possible.

It is another object of the invention to aid the solution of the above-mentioned object in the manner that the pinion (e.g. 1) is made of a soft-elastic material and is provided with a concentric recess (8) for the free passage of the shaft (2) and with an axial shoulder (9) having a concentric hole (10) to receive the shaft (2), and the input gear (4) is made of an elastic material.

By the use of a soft-elastic pinion in combination with an elastic input gear and by the special construction of the pinion, by which that part of the pinion which engages with the input gear can yield or move away both in radial and in circumferential direction or in the sense of a rolling motion, there is obtained an extremely strong silencing or dampening of the operating noise. In addition, simple manufacture of the gear is assured, for example by means of injection molding or transfer molding, by the construction of the pinion in accordance with the present invention.

A further improvement in the muffling or dampening of the noise can furthermore by obtained in the manner that the pinion (1) and the input gear (4) are each provided with cycloidal gear teeth (6, 7). Such a cycloidal toothing has the advantage over the customary involute gear teeth or toothing in that the height of the individual teeth is greater than in the case with an involute toothing, as a result of which the elasticity of the engagement of the two gears is increased and the impacts and jerky or back movements caused by the rotor, armature or escapement steps and the overshooting of the rotor, armature or escapement are considerably damped or attenuated.

An optimalizing of the dampening of the noise can be obtained in the manner that the input gear is made of a material of soft elasticity. Since, however, difficulties in manufacture possibly may then occur, it is advisable to make the input gear from a material of medium elasticity having a Shore A hardness of about 89 to 93. It is true that the dampening of the noise which can be obtained with such an input gear is not as good as that which can be obtained with an input gear which is made of a soft-elastic material; however, such an input gear made of a material of medium-elasticity can be manufactured in a simple fashion, for instance by injection molding or transfer molding.

In accordance with one particularly advantageous embodiment, the pinion (e.g. 1) and the input gear (4) are made of a polyurethane elastomer. In addition to the good soft- and medium- elastic properties, respectively, of this material (or soft-to-medium elastic properties), it has the advantage that it can be worked particularly easily by injection molding and transfer molding, respectively.

It may be mentioned here that by the expression "soft-elastic", it comprises a material which has a Shore A hardness of up to and including 88. The expression "medium elastic" comprises a material having a Shore A hardness of between and including 89 to 93. The expression "hard elastic" is defined to mean a material having a Shore A hardness or more than 93.

Figure 2:
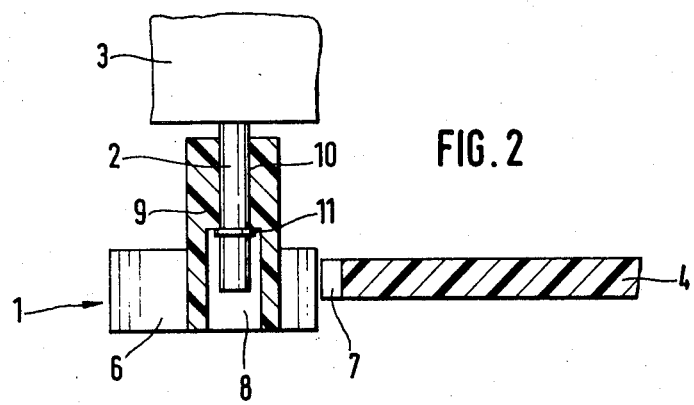

With the above and other objects and advantages in view, the present invention will become more clearly understood in connection with the following detail description of a preferred embodiment, when considered with the accompanying drawings, of which:

FIG. 1 is a plan view of an electrical clock of the invention with the pinion meshing with the input gear partly broken away; and FIG. 2 is a section through the pair of gears of FIG. 1 taken along the lines II—II of FIG. 1.

Referring now to the drawing, in accordance with the present invention, a gear combination, which is shown greatly enlarged, comprises a pinion 1 which is seated on the shaft 2 of a single-phase stepping motor 3 of a quartz-crystal clock with analog display, and a gear 4 which is the input gear of the motion work of the quartz-crystal clock. This input gear 4, which is seated on a shaft 5, then drives other gears which act on the minute and hour wheels, respectively, of the clockwork.

Each of the two gears 1 and 4 is provided with cycloidal toothing 6 and 7, respectively. The pinion 1 has a central cutout or recess 8, the inside diameter of which is greater than the outer diameter of the shaft 2, and it also has an axial set-off or shoulder 9 having a hole 10, the inside diameter of the opening 10 being smaller than the outside diameter of the shaft 2, so that the pinion 1 is seated firmly or rigidly on the shaft 2. In order to guarantee that the pinion 1 cannot slide off from the shaft 2 even in case of higher stresses, the shaft 2 may be provided with a collar 11 or else with a knurling. Frequently, however, neither of these two measures is necessary, since the danger of slipping does not exist in the case of the torques which are customarily transmitted in clock movements.

Both the gears 1 and 4 are made of a polyurethane elastomer (for instance, although not limited thereto, of the polyurethane elastomer known under the trade name of Desmopan), which can be worked thermoplastically. For the pinion, a soft-elastic type of polyurethane is used (Shore A hardness about 82), while for the input gear, polyurethane of a medium-elastic type (Shore A hardness about 91) is used.

We claim:

1. An electric clock, particularly a quartz-crystal clock, having a motion work which is driven by an electric motor having a shaft, comprising
   a pinion including teeth made of an elastic material being seated on the shaft of the motor,
   an input gear of the motion work, said input gear having teeth meshing with the teeth of said pinion,
   said pinion including said teeth thereof is made of a soft-elastic material, said pinion is formed directly radially adjacent a base of said teeth thereof with a peripheral wall defining a concentric recess for the free passage of the shaft therein and said pinion is formed with an axial shoulder, constituting an inner end of said concentric recess, having a concentric hole therein fixedly receiving the shaft in said concentric hole,
   said base of said teeth and said peripheral wall of said concentric recess radially adjacent said base of said teeth are free, non-abutted by and spaced from said shaft, and
   said input gear including said teeth thereof is made of an elastic material.

2. The electric clock according to claim 1, wherein said input gear including said teeth thereof is made of a soft-elastic material.

3. The electric clock according to claim 1, wherein said input gear including said teeth thereof is made of a medium-elastic material having a Shore A hardness of about 89 to 93.

4. The electric clock according to claim 1, wherein said teeth of said pinion and said input gear each have a cycloidal toothing.

5. The electric clock according to claim 1, wherein said pinion and said input gear are made of a polyurethane elastomer.

6. The electric clock as set forth in claim 1, wherein said axial shoulder integrally extends on one side of said pinion, said concentric recess and said concentric hole extend through said pinion and said axial shoulder, respectively, communicating with each other, and said concentric hole has a cross-section smaller than that of said concentric recess, said axial shoulder forms an annular portion inside said concentric recess where said concentric recess communicates with said concentric hole, and said concentric recess extends over the entire thickness of said teeth of said pinion from the other side of said pinion and one side of said teeth thereof into said axial shoulder beyond the other side of said teeth of said pinion.

7. The electric clock as set forth in claim 6, further comprising
   means for guaranteeing a secure connection between said shaft and said axial shoulder.

8. The electric clock as set forth in claim 7, wherein said means comprises a collar mounted on said shaft, said collar engages on said annular portion inside said concentric recess.

9. An electric clock, particularly a quartz-crystal clock, having a motion work which is driven by an electric motor having a shaft, comprising
   a pinion including teeth made of an elastic material being seated on the shaft of the motor,
   an input gear of the motion work, said input gear having teeth meshing with the teeth of said pinion,
   said pinion including said teeth thereof is made of a soft-elastic material and said pinion is formed adjacent a base of said teeth thereof with a concentric recess for the free passage of the shaft therein and with an axial shoulder having a concentric hole therein to receive the shaft,
   said input gear including said teeth thereof is made of an elastic material,
   said concentric recess extends over the entire thickness of the base of said teeth, said concentric recess directly radially adjacent said entire thickness of said base of said teeth is free, non-abutted by and spaced from said shaft,
   said pinion is secured to said shaft in said hole, the latter having an unstressed diameter smaller than an outside diameter of said shaft.

* * * * *